April 22, 1941.                    P. H. KOLB                    2,239,328
                  SPEED CONTROL ATTACHMENT FOR SPEEDOMETERS
                    Filed Nov. 17, 1937            2 Sheets-Sheet 2
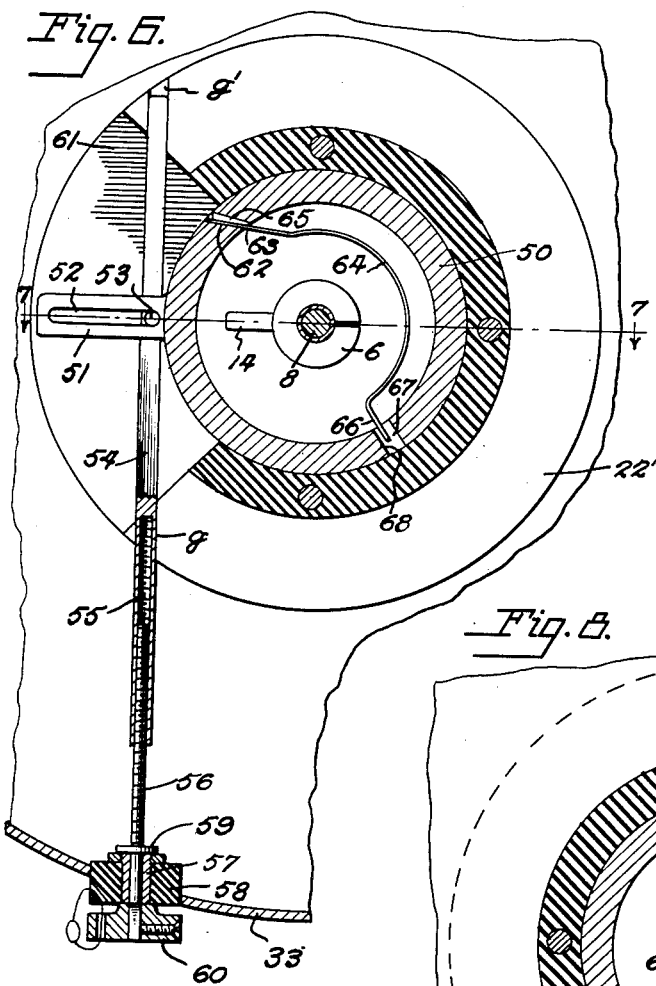
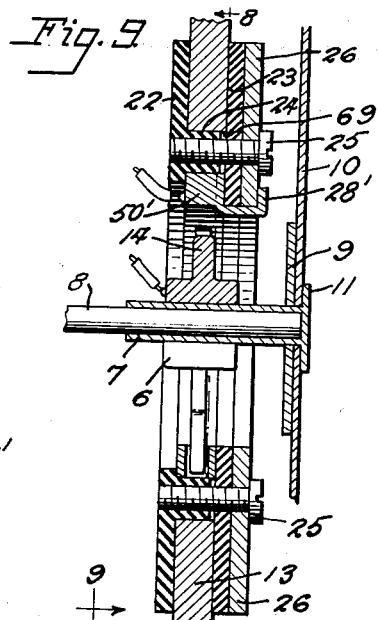
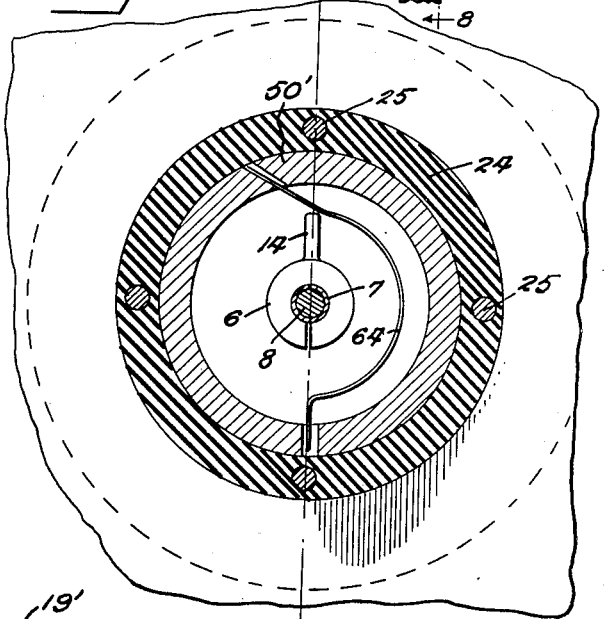
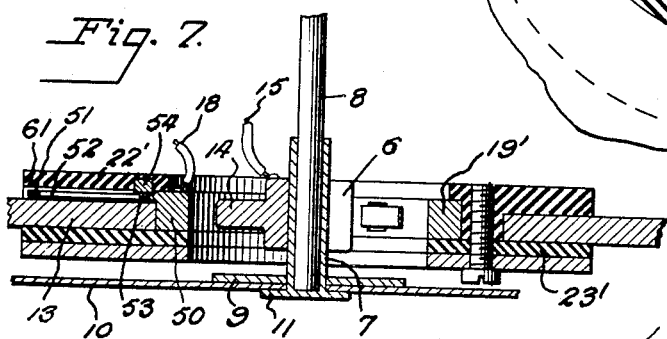
Inventor
P. H. Kolb
By Mason, Fenwick & Lawrence
Attorneys Patented Apr. 22, 1941

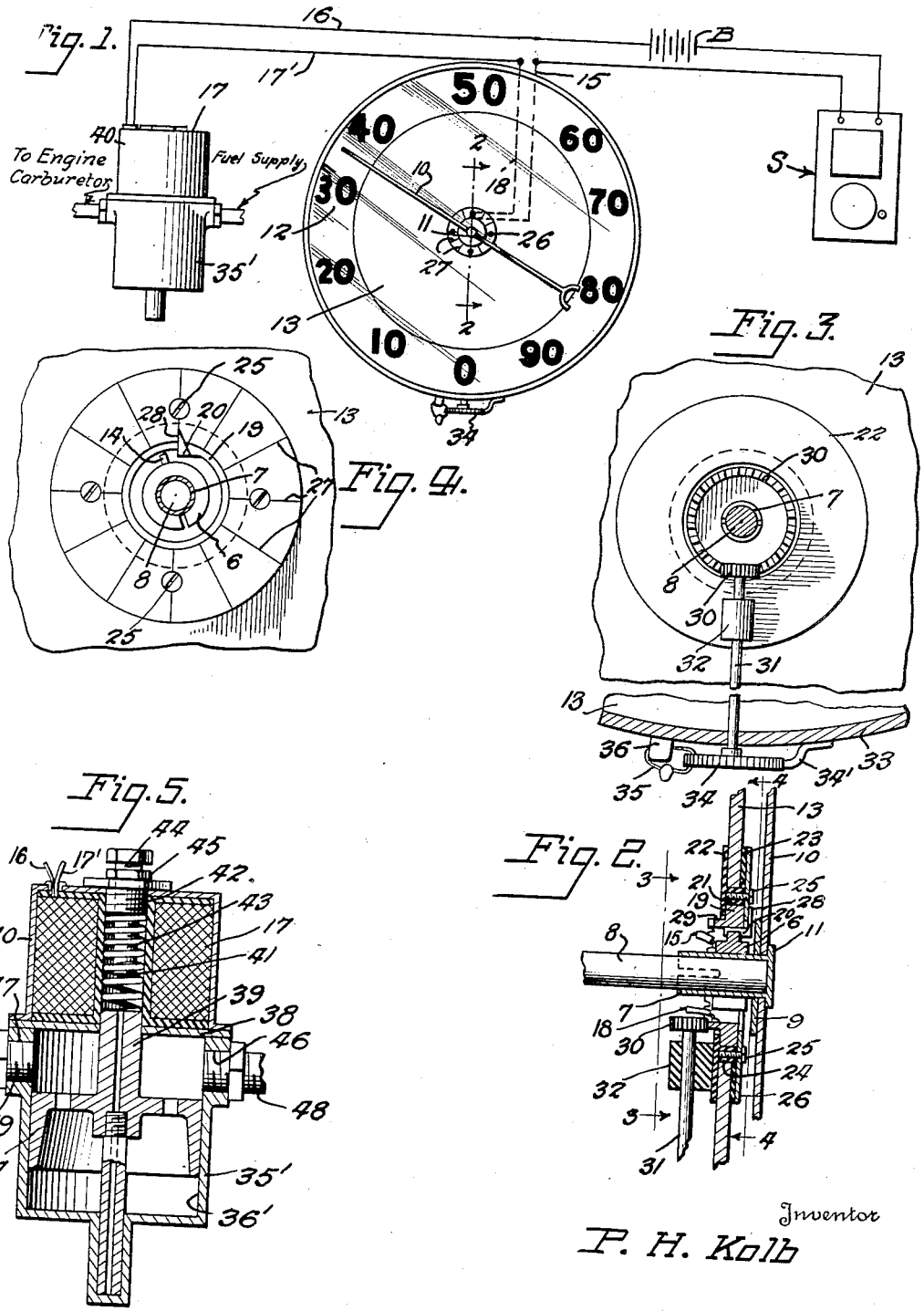

2,239,328

UNITED STATES PATENT OFFICE 2,239,328

SPEED CONTROL ATTACHMENT FOR SPEEDOMETERS

Paul Huber Kolb, Williamsport, Pa.

Application November 17, 1937, Serial No. 175,168

3 Claims. (Cl. 200—56)

The invention forming the subject matter of this application is an attachment designed to be applied to the dial and shaft of a standard type speedometer for the purpose of limiting the speed of the vehicle carrying the speedometer within predetermined limits.

As is well known in this art, governor operated controls are in common use on motor vehicles, and particularly on trucks, for controlling the revolutions per minute of the engines which impart movement to such vehicles. While these vehicles are in movement on substantially horizontal roads, these governor operated controls are effective to limit the speeds of the vehicles within predetermined limits. However, when vehicles so controlled encounter steep hills, or become mired in mud or sand, the governor controls prevent the engine operating at a speed which would enable the vehicle to travel at a reasonable speed up such hills, or to pull out of the mud or sand. This stalling, or slowing down, of the governor controlled vehicles is a frequent cause of accidents, resulting from other vehicles attempting to pass such stalled or slowly moving vehicles.

The main object of the invention is to provide a small, highly efficient attachment for a standard type speedometer which can be adjusted to cooperate with such speedometer, to limit the speed of the vehicle without interfering with the speed of the engine when the vehicle is laboring under heavy load or on steep hills or in mud or sand, under the speed limit for which the attachment may be set.

Another object of the invention is to provide an attachment for a speedometer which can be manufactured in large quantities at low cost, and which can be very readily attached to standard speedometers without the necessity of making any material alterations in the structural elements of the speedometer.

Other objects of the invention will become apparent as the detailed description thereof proceeds.

In the drawings:

Figure 1 is a diagrammatic layout illustrating one form of this invention as applied to a speedometer of standard construction;

Figure 2 is a vertical section to an enlarged scale taken on the line 2—2 of Figure 1;

Figure 3 is a vertical section taken on the line 3—3 of Figure 2;

Figure 4 is a vertical section taken on the line 4—4 of Figure 2;

Figure 5 is a central vertical section through a valve controlling the supply of liquid fuel to the carburetor of the automobile engine;

Figure 6 is a fragmentary vertical section through a modified form of the attachment, as applied to a speedometer;

Figure 7 is a horizontal section taken on the line 7—7 in Figure 6;

Figure 8 is a section taken on the line 8—8 of Figure 9 illustrating still another form of the invention; and Figure 9 is a section taken on the line 9—9 of Figure 8.

Referring to the drawings, in which similar parts are designated by like numerals:

The form of the invention illustrated in Figures 1-5 comprises a small collet adapted to be secured by snug friction fit on the sleeve 7 suitably secured to the speedometer shaft 8. This sleeve 7 is provided with the usual washer 9 secured by friction to the sleeve 7 and forming a means for clamping the hand 10 of the speedometer against the flange 11 formed at the end of said sleeve 7.

It is to be understood that the speedometer shaft 8 will be suitably connected through speed responsive mechanism to the wheels of the motor vehicle so that the speed indicator 10 will rotate in accordance with the speed of movement of the motor vehicle on the roadway, and will indicate such speed on the scale 12 formed on the dial 13. The structural details of this speed responsive mechanism are not illustrated herein, since they are old and well known in the art, and form no part of the present invention.

The collet 6 is provided with a contact 14 projecting radially from the periphery thereof, and obviously rotates with the speedometer shaft 8 in accordance with the speed of the motor vehicle. The collet 6 is electrically connected by a wire 15, through a signal device S to one terminal of the battery B. The other terminal of the battery is connected to one terminal of the solenoid 17 by the conductor 16. The solenoid 17 forms a part of the valve 40, for controlling the supply of liquid fuel to the carburetor of the engine. The other terminal of the solenoid is connected by wire 17' to the conductor 18 which in turn, connects with the conducting ring 19. From the latter projects radially a second contact 20'.

The ring 19 is mounted to rotate on the dial 13, coaxially with the speedometer shaft 8, in a groove 21 formed by clamping a pair of washers 22 and 23 on opposite sides of the dial 13. The washers 22 and 23 are made of insulating material; and the washer 22 is provided with an annular flange 24 which forms the bottom of the groove 21 and is coaxial with the axis of the speedometer shaft. The annular flange 24 is provided at intervals with internally screw threaded bores adapted to receive the machine screws 25 which pass through a metallic indicating plate 26. The plate 26 therefore operates as a clamping plate to bring the washer 22 firmly against the back of the dial 13 with the washer 23 firmly secured against the face of the dial 13.

The face of the plate 26 is provided with graduations 27 corresponding in position to the graduations indicating speeds on the dial 13. The second contact 20 projects through the central aperture in the dial 13 and is provided with a small pointer 28, which indicates on the scale 27 the speed limit for which the instrument is set.

The setting of the attachment is effected by forming an annular flange 29 on the ring 19 and by providing this flange with teeth to form a crown gear engaged by the teeth on a pinion 30 suitably secured to the end of a shaft 31. The shaft 31 is journaled to rotate in a bearing 32 suitably secured to the clamping ring 22. The shaft 31 projects through the rim 33 of the speedometer casing and has a knob or disc 34 secured to its outer end to facilitate rotation of the shaft in its bearing.

The knob 34 may be provided with apertures adapted to receive a sealing wire 35 which may be passed through an apertured lug 36 fixed to and projecting from the rim 33 on the speedometer casing. The periphery of the knob 34 is notched to receive one end of a spring "click" secured at its other end to the rim 33, thereby providing a resilient latching means for holding the contact 20 releasably in adjusted position. By this means the attachment may be set to limit the speed of the vehicle to any desired maximum speed, and the setting mechanism may be locked and sealed in adjusted position in order to prevent tampering therewith.

The valve mechanism controlled by the solenoid 17 comprises a casing 35′ provided with a cylindrical bore 36′ in which a piston 37 is mounted to reciprocate. The casing 35′ is provided with a head 38 centrally apertured to receive a stem 39 which forms the armature for the solenoid 17, the latter being mounted in a casing 40 suitably secured to the upper end of the casing 35 and provided with a central bore 41 to receive slidably the stem 39 of the piston 37. The bore 41 is closed at its upper end by a plug 42 to which is attached a compression spring 43 forming a cushion for the stem 39. The plug 42 is provided with an axial screw threaded bore to receive the adjustable stop rod 44 adapted to be secured in adjusted position by a lock nut 45.

The casing 35′ is provided with diametrically opposite screw threaded bores 46 and 47 which receive fittings 48 and 49 connected, respectively, to a source of liquid fuel supply and the carburetor of the engine. The stop rod 44 may be adjusted so as to permit the piston valve 37 to cut the supply of fuel off completely from the carburetor. However, it is not intended that the engine should be stopped when the motor vehicle arrives at the predetermined maximum speed for which the attachment is set. It is only necessary to adjust the stop rod 44 so as to reduce the fuel supply to the carburetor sufficiently to effect an immediate reduction in the speed of the vehicle, and to maintain that vehicle speed reduced so long as the solenoid 17 is energized by the closing of its circuit through the contacts of the attachment.

It will be evident that reduction in fuel supply reduces the R. P. M. of the engine only when the contacts of the attachment are in contact with each other. This permits the driver to speed up the engine to its limit when the vehicle speed is lowered by operation in sand or mud or by steep grades and heavy loads. In other words, the attachment imposes no limitations whatever on engine speed so long as the vehicle speed is below the predetermined maximum limit.

The modification illustrated in Figures 6 and 7 differs mainly from that shown in Figures 1, 2, 3 and 4 in the structural details of one of the cooperating control elements of the attachment, and in the means for adjusting a contact element to predetermine the maximum speed of operation of the vehicle. The adjustable element in this form of the invention comprises a ring 50 rotatable in the groove formed by the clamping washers 22′ and 23′ arranged on opposite sides of the dial 13 in the manner illustrated in Figure 7 of the drawings. The ring 50 is provided with the radially extending arm 51 having a slot 52 formed therein to receive a pin 53 projecting laterally from an adjusting rod 54. This rod 54 is rectangular in cross section and is provided at one end with an internally screw threaded bore 55 in which is received the externally screw threaded rod 56.

The rod 56 extends through and rotates in a bushing 57 suitably secured in a collar 58 fixed to the casing 33 of the speedometer. A flange 59 secured to the rod 56 limits the outward movement of said rod 56, and a knob 60, fixed to the end of the rod 56 where it projects through the collar 58 limits the inward movement of the rod 56. It is obvious that the rod 56 may be rotated in its bushing 57 by the rotation of the knob 60; and that such rotation will cause the rod 54 with its pin 53 to rotate the ring 50 about the axis of the shaft 8 in opposite directions. In this form, the washer 22′ is provided with an arcuate recess 61 to provide space for the necessary adjusting movements of the arm 51; and is also provided with guide grooves g and g′ for the rod 54.

The contact ring 50 is provided with a slot 62 adapted to receive the straight portion 63 of an arcuate spring contact 64 adapted to cooperate with the contact 14 extending radially from the collet 60. The slot 62 is shaped to receive a wedge 65 for the purpose of clamping the straight portion 63 securely in position on the ring 50. The contact 64 is bent to form a semi-circle of slightly less radius than the radius of the contact 14; and the free end of the strip 64 is bent so as to form a radial projection 66. The ring 50 is provided with a radial slot 67 into which the projection 66 extends. The wall 68 of this slot is intended to limit the outward movement of the projection 66 and the strip 64 so as to insure a firm yielding contact with contact 14 when the latter has rotated sufficiently to make contact with the inner surface of the strip 64. In all other respects, this attachment is similar to that illustrated in Figures 1 and 2.

It will be apparent that the setting of the outer contact ring in this form of the invention must be limited by the character of the setting mechanism. The recess 61 and the length of the arm 51 obviously suggest the setting between predetermined limits such, for example, as 30 miles per hour and 60 miles per hour. Any higher or lower range of adjustment could be effected by adjustment of the collet 6 on the sleeve 7.

It is contemplated that this invention may be used without any externally accessible setting means; that is, that the speedometer provided with this attachment may have the attachment set for speed limit in the factory with the casing sealed so as to prevent access to the attachment without breaking either the casing or its glass cover. A form of the invention peculiarly adapted for this last named procedure is illustrated in Figures 8 and 9 in which the same spring contact is used as in the form shown in Figures 6 and 7. So far as the rotatable contact ring is concerned, it is seated in a groove formed by the clamping washers 22 and 23 similar to those shown in Figure 1 of the drawings. To secure the proper clamping effect, the annular flange 24 of Figure 2 is made narrower than that shown in Figure 2 to provide a space 69 to provide for an efficient clamping action between the washers 22 and 23 by the operation of the screws 25 on the indicator plate 26.

To facilitate the setting of this form of the invention the ring 50' has suitably secured thereto a small pointer 28' which indicates on the scale 27 the speed limit for which the instrument is set. Obviously, when the clamping screws 25 are loosened, the ring 50' may be rotated into the desired position by means of the indicating arm 28. It is to be understood, of course, that the scale on the plate 26 shall in this case be somewhat similar to the scale 27 illustrated in Figure 1 of the drawings.

With the exception of Figure 1, the structural details of the attachment are shown on the drawings to a much larger scale than is necessary in actual practice. In several forms of the invention actually used to control the speed of motor vehicles, the outside diameter of the attachment is less than three-fourths of an inch and its thickness is less than one-eighth of an inch. As applied to a standard speedometer, nothing appears on the face of the speedometer but the ornamental small plate 26 and the indicator 28. The standard speedometer requires no modification to receive this attachment except the slight enlargement of a central shaft aperture to receive the small indicating arm projecting from the adjustable contact over the scale 27 for the purpose of indicating the maximum speed for which the instrument is set.

Since the attachment for speedometers as herein described is to be applied to the usual automotive vehicles now in common use, it will be readily understood that as such vehicles are commonly controlled by means of an ignition switch, the present device will also be controlled by such a switch. There is no reason for operating the device with an independently controlled circuit, since it is only to be energized at times when the ignition of the vehicle is being used, i. e., when the vehicle is in operation.

What I claim is:

1. An attachment for speedometers having a fixed dial with a central aperture and a speed responsive shaft extending through said aperture carrying a pointer adapted to cooperate with the dial comprising arcuate clamping members, means for securing said clamping members on opposite faces of the dial adjacent the central aperture to form with said dial an arcuate channel, a ring rotatably mounted in the channel and carrying an electrical contact on its inner face directed toward the shaft and a radially disposed electrical contact member mounted on the shaft within the ring and the plane of the dial substantially as specified.

2. In a speedometer having a fixed dial with a central aperture and a rotatable shaft extending through said aperture and carrying a pointer adapted to cooperate with said dial to indicate vehicle speed, switch means comprising arcuate clamping members secured within the central aperture of the dial and against opposite faces thereof forming an annular channel, a ring rotatably mounted in said channel, an electrical contact member carried on the inner cylindrical face of said ring, an electrical contact member mounted on the shaft within said ring, and means for adjustably rotating the ring with respect to the dial.

3. In a speedometer having a fixed dial with a central aperture and a rotatable shaft extending through said aperture and carrying a pointer adapted to cooperate with said dial to indicate vehicle speed, switch means comprising a ring member rotatably mounted within the central aperture of the dial, an electrical contact member carried on the inner cylindrical face of said ring, an electrical contact member mounted on the shaft within said ring, and means for adjustably rotating the ring with respect to the dial, said ring being formed with a radial pointer and being positioned within the central aperture of the dial by arcuate clamping members secured on opposite faces of the dial, the front clamping member being graduated to cooperate with the ring pointer, said clamping members forming an annular channel within which the ring is rotatably mounted.

PAUL HUBER KOLB.